United States Patent [19]
Kelly

[11] Patent Number: 5,987,718
[45] Date of Patent: Nov. 23, 1999

[54] CLUTCH FASTENER

[76] Inventor: Kevin J. Kelly, 4855 Kenneth St., Hastings, Fla. 32145

[21] Appl. No.: 09/039,186

[22] Filed: Mar. 16, 1998

Related U.S. Application Data

[60] Provisional application No. 60/043,082, Apr. 8, 1997.

[51] Int. Cl.⁶ .................................................. A44C 7/00
[52] U.S. Cl. ......................... 24/705; 24/674; 24/706.6; 24/707.3
[58] Field of Search ............................... 24/707.3, 706.6, 24/674, 705; 63/12, 438; 411/929.1; 403/229; 174/87; 439/841

[56] References Cited

U.S. PATENT DOCUMENTS

| | | |
|---|---|---|
| 986,053 | 3/1911 | Goldsmith . |
| 995,744 | 6/1911 | Watkins . |
| 1,014,838 | 1/1912 | Meyer . |
| 2,775,992 | 1/1957 | Smith . |
| 2,934,123 | 4/1960 | Brancato . |
| 2,936,625 | 5/1960 | Heisler . |
| 3,010,745 | 11/1961 | Blomstrand et al. . |
| 3,316,795 | 5/1967 | Tann . |
| 3,497,607 | 2/1970 | Swanson . |
| 3,515,027 | 6/1970 | Textrom . |
| 3,943,587 | 3/1976 | Lasky . |
| 3,945,070 | 3/1976 | Hauser . |
| 3,945,089 | 3/1976 | Gagnon . |
| 4,131,167 | 12/1978 | Richey . |
| 4,292,715 | 10/1981 | Huddon . |
| 4,632,496 | 12/1986 | Williams . |
| 4,834,571 | 5/1989 | Greenburg . |
| 5,384,930 | 1/1995 | Uno . |

FOREIGN PATENT DOCUMENTS

| | | |
|---|---|---|
| 0608504 A1 | 8/1994 | Denmark . |
| 759758 | 8/1980 | U.S.S.R. . |
| 2032251 | 5/1980 | United Kingdom . |

*Primary Examiner*—James R. Brittain
*Attorney, Agent, or Firm*—Richard C. Litman

[57] ABSTRACT

A clutch fastener is provided for securely receiving pins, shafts, and the like. The clutch fastener includes a housing and a coil spring disposed within a central chamber contained in the housing. The chamber originates near the top surface of the housing and extends through the bottom surface. The bottom surface is countersunk to provide for easy insertion of the shaft. The chamber is sized such that it has a larger diameter than the shaft to be retained. The shaft is inserted into the chamber and retained by frictional forces generated against the coil spring. The clutch fastener may allow the user to selectively increase the tension placed on the shaft via a locking mechanism. The clutch fastener may also be provided with a second spring disposed within the chamber in order to limit the degree of compression of the first spring. Various designs are also disclosed for the spring stock from which the coil spring is formed.

9 Claims, 3 Drawing Sheets

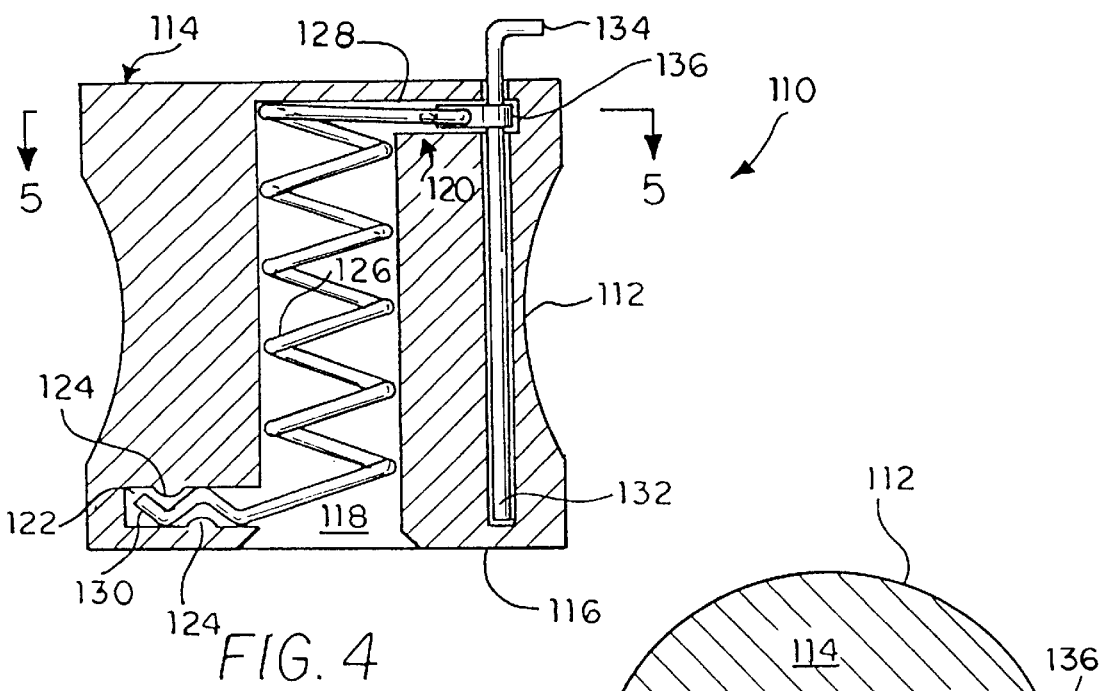
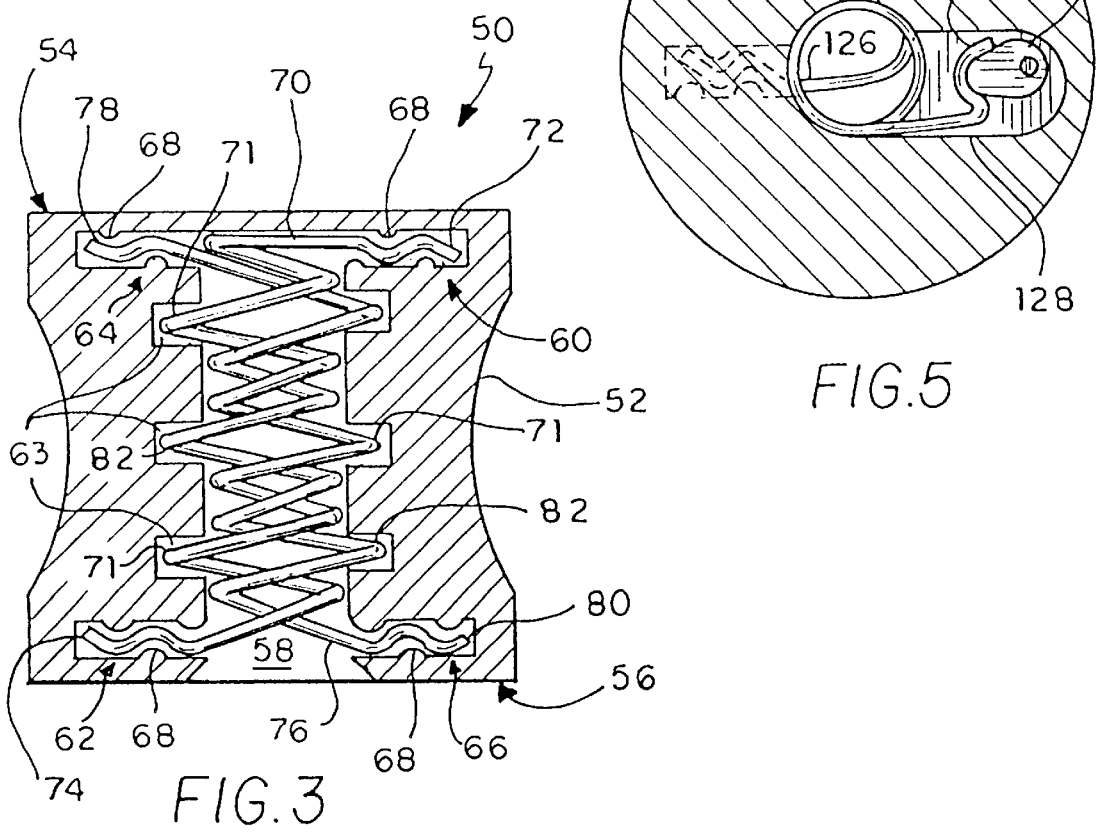

CLUTCH FASTENER

CROSS-REFERENCE TO RELATED APPLICATION

This application claims the benefit of U.S. Provisional Patent Application Serial No. 60/043,082, filed Apr. 8, 1997.

BACKGROUND OF THE INVENTION

1. Field of the Invention

The present invention relates to clutch fasteners and more particularly to clutch fasteners incorporating helical spring retention mechanisms.

2. Description of Related Art

Clutch type securing devices are well known for gripping and securing posts, studs, or the like. Clutch type securing devices often serve to provide an enclosure for the sharp ends of jewelry pins, tie pins, etc. Such devices come in various forms. For example, a plurality of fingers may be provided to grip the stud or post. Other arrangements include a plurality of plate-like devices which act as spring clutches. A common problem associated with such securing devices is a loss of the frictional force necessary to retain the pin. In such instances, the securing portion may be lost, leaving the pin exposed to possibly harm an individual.

Various clutch type securing devices have been presented in the past to overcome the aforementioned disadvantages. For example, U.S. Pat. No. 2,934,123 issued on Apr. 26, 1960 to Brancato discloses a coil insert with an outer engaging locking coil. The device includes a small locking spring which is introduced into a bore parallel to the cavity into which the screw thread insert of large diameter is to be placed. The locking spring is wound left-handed if the insert is wound right-handed, and vice versa. The locking spring engages between convolution portions of the screw thread insert to displace the engaged portions.

U.S. Pat. No. 3,010,745 issued on Nov. 28, 1961 to Blomstrand et al. discloses a frictionally driven wire connector. The device is constructed so that no tangential handles or other positive abutting members need be relied upon. The device includes a stiff, resilient coil having a forwardly directed enlarged opening and a diminished portion rearwardly thereof. The wire connector coil includes substantially circular convolutions, the rearmost of which are adapted to expand under unwinding force and automatically provide an increasing gripping relation to the inner surface of a sleeve.

U.S. Pat. No. 3,316,795 issued on May 2, 1967 to Tann discloses a fastening device including helical spring-like element. A piece of wire-like material is formed into a spring-like element wherein the convolutions of the spring-like element increase in diameter from one end of the spring to the other. By positioning the spring-like element within a tapered threaded nut, or around a tapered threaded screw, and rotating and advancing the nut or screw relative to the spring-like element, the spring-like element can be made to contract or expand radially. The expansion of the spring-like element can be utilized to seize or lock a member positioned within the spring-like element in the case of a nut, and the contraction utilized to lock a member positioned about the spring-like element in the case of the tapered threaded screw.

U.S. Pat. No. 3,945,070 issued on Mar. 23, 1976 to Hauser discloses a method of creating a wire thread cast insert. A wire of given cross-sectional shape is formed into a helical configuration. The pitch of the helical turns is adjusted over a major length of the configuration to a given value greater than the desired final given thread pitch to be provided in the threaded opening of a body. An internal support in the form of a core is introduced into the helical configuration. Thereafter, the material involved, plastic or metal, is molded or cast around the helical configuration and support until it hardens into a solid body. The internal support is then removed to leave a threaded opening in the body.

U.S. Pat. No. 3,945,089 issued on Mar. 23, 1976 to Gagnon discloses a securing device which is usable for studs of buttons, emblems, earrings, insignia and the like. The device includes a first part having a cylindrical stud extending therefrom. A second part is provided into which the stud may pass. The second part also includes a resilient clutch that grips a substantial length of the cylindrical stud.

U.S. Pat. No. 4,292,715 issued on Oct. 6, 1981 to Huddon discloses a clutch device for holding together two articles of jewelry such as earrings, pins, necklaces, etc. The clutch includes a tubular housing closed at both ends except for a small central opening in the center of each end. A coil spring is mounted in the housing with each of its ends turned inwardly toward the axis of the spring so that a sharp edge at the end presents itself to a pin entering the openings. The sharp edge grips the pin and holds it against removal. The second part of the clutch is a pin, having a diameter slightly less than the internal diameter of the spring, which may be attached to the article of jewelry. With the housing in one part and the pin in the other, two jewelry portions can be joined by a frictional gripping action.

U.K. Patent Application No. 2,032,251 published on May 8, 1980 discloses a point protector for tie pins and like articles of jewelry. The device includes a body constructed of resilient plastic materials. The body includes two end pieces which are contained in a metal casing. The metal casing is initially a tube which is counter-drilled at each end to provide locations for the end pieces. The body, one end piece, and the casing have bores to receive the point to be shielded.

Soviet Union Patent No. 759,758 issued in August 1980 discloses a detachable clamp joint with spiral insert having conical surfaces to join items for reliability. The device consists of an outer item containing a hole therein, an inner item having a tip, and an intermediate spiral insert which is made from a harder material and fits between the tip and the inner surface of the hole.

None of the above inventions and patents, taken either singly or in combination, is seen to describe the instant invention as claimed.

SUMMARY OF THE INVENTION

Accordingly, it is a principal object of the invention to provide a clutch fastener for retaining pins, shafts, and the like.

It is another object of the invention to provide a clutch fastener which utilizes a coil spring to produce necessary frictional forces.

It is a further object of the invention to provide a clutch fastener which allows adjustment of the tension placed on the shaft.

Still another object of the invention is to provide a clutch fastener capable of reducing the degree of compression of the coil spring.

It is an object of the invention to provide improved elements and arrangements thereof in an apparatus for the purposes described which is inexpensive, dependable and fully effective in accomplishing its intended purposes.

In accordance with the objects of the invention, a clutch fastener is provided for securely receiving pins, shafts, and the like. The clutch fastener includes a housing and a coil spring which is retained within the housing. The housing includes a top surface and a bottom surface. The housing also contains a chamber centrally disposed in its interior. The chamber originates near the top surface of the housing and extends through the bottom surface. The bottom surface of the chamber is countersunk to provide for easy insertion of the shaft. The chamber is sized such that it has a larger diameter than that of the shaft to be retained. The coil spring is formed from a solid spring stock which has a first end and a second end. The spring stock is coiled in a helical manner to form the coil spring and define a plurality of coils. The coil spring is then disposed and retained within the chamber contained in the housing. The shaft is subsequently inserted into the chamber and retained by frictional forces generated against the coil spring.

In accordance with another aspect of the invention, the clutch fastener allows the user to increase the tension placed on the shaft in order to provide a more secure fit. A first tunnel extends perpendicularly from the chamber and extends into the housing. The first tunnel is positioned at a location near the top surface. The coil spring is constructed such that its first end terminates in a hook and the first end is disposed within the first tunnel. An arm extends into the chamber from the top surface and terminates at a location near the bottom surface. The arm also intersects the first tunnel. A handle is attached to the first, or external, end of the arm in order to place the arm in a locked or unlocked position. A cam lobe is coupled to the arm such that it is in registry with the first tunnel and in contact with the hook on the first end of the coil spring. When the arm is placed in the locked position, the cam lobe engages the hook and increases the tension on the coils of the coil spring in order to increase the tension on the shaft.

In accordance with another aspect of the invention, the degree of compression of the coils is limited in order to increase the strength of the clutch fastener. A second coil spring is disposed within the housing and intertwined with the first coil spring. The second coil spring includes a first end and a second end. The coils of the second coil spring have a period which is greater than that of the first coil spring. Thus, several coils of the first coil spring are limited by each coil of the second coil spring.

The coil springs may be formed from spring stock having various constructions in order to increase the tension on the shaft and/or increase the friction between coils and the walls of the housing which define the chamber. Furthermore, the spring may be formed from spring stock which includes a plurality of upswept teeth for allowing the clutch fastener to thread onto a shaft clockwise, while resisting counter-clockwise rotation.

These and other objects of the present invention will become readily apparent upon further review of the following specification and drawings.

BRIEF DESCRIPTION OF THE DRAWINGS

FIG. 3 is a side elevational cutaway view of a second embodiment of the clutch fastener.

FIG. 4 is a side elevational cutaway view of a third embodiment of the clutch fastener.

FIG. 5 is a sectional view of the second embodiment of the clutch fastener.

Similar reference characters denote corresponding features consistently throughout the attached drawings.

DETAILED DESCRIPTION OF THE PREFERRED EMBODIMENTS

Figure 1:
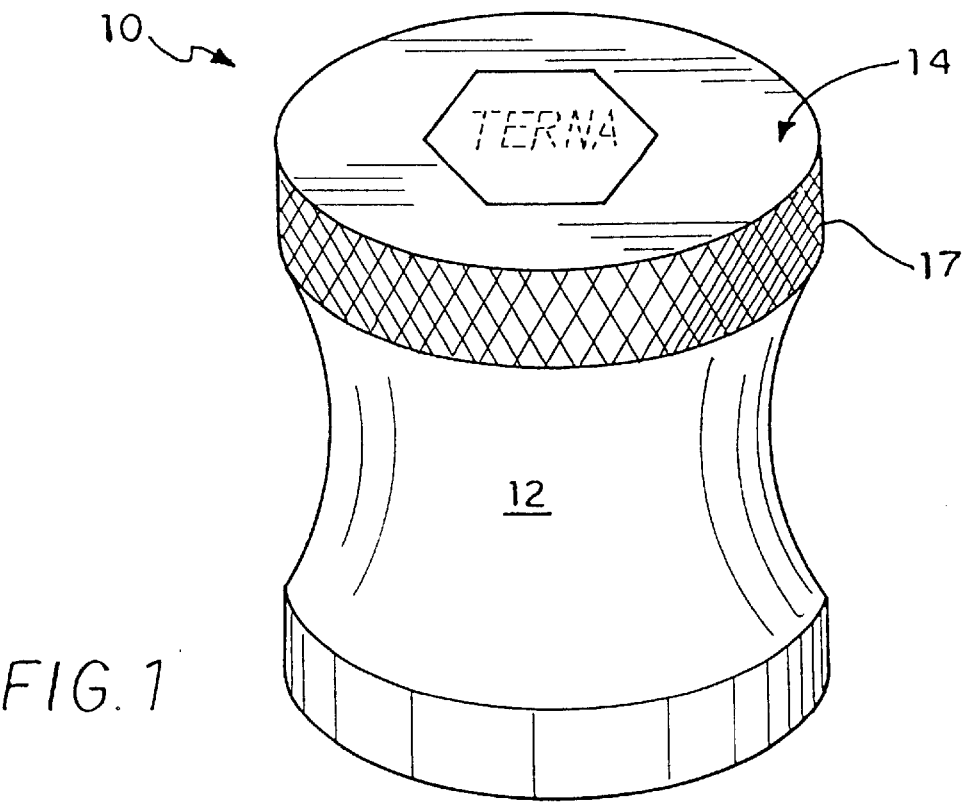
FIG. 1 is a perspective environmental view of a clutch fastener in accordance with the present invention.
Figure 2:
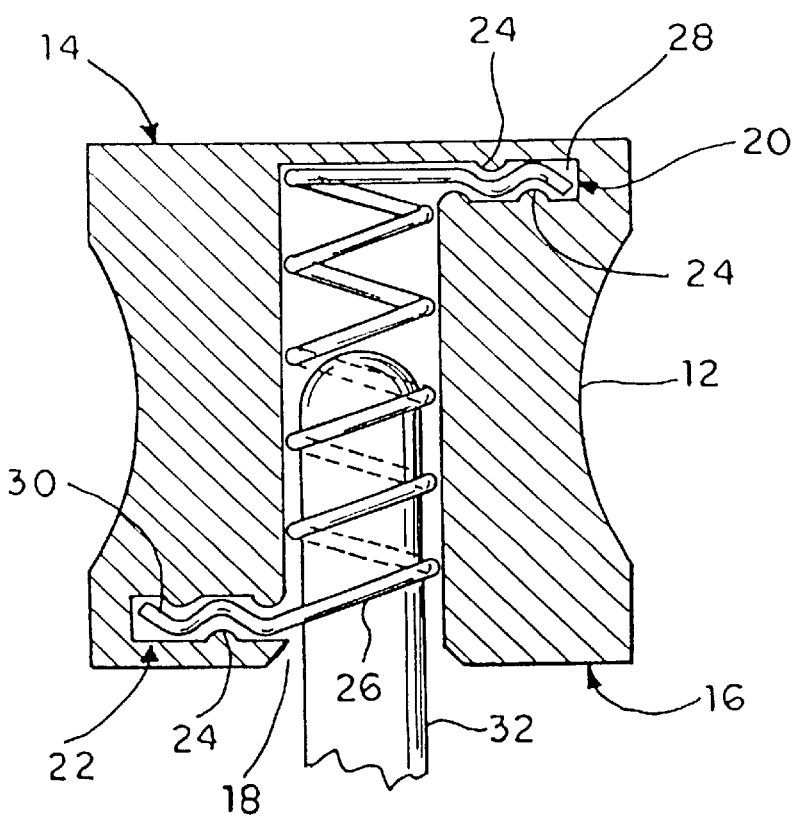
FIG. 2 is a side elevational cutaway view of a clutch fastener retaining a shaft.

Referring now to the drawings and initially to FIGS. 1 and 2, a clutch fastener 10 is shown for retaining pins, shafts, and the like. I have designated this type of clutch fastener a Terna fastener. As seen in the FIGS. 1 and 2, the clutch fastener 10 is used to retain a tubular shaft 32. The clutch fastener 10 includes a housing 12 which has a top surface 14 and a bottom surface 16. A chamber 18 is centrally disposed within the housing 12. The chamber 18 originates near the top surface 14 of the housing 12 and extends through the bottom surface 16. The bottom surface 16 is countersunk to provide for easy insertion of the shaft 32. A first tunnel 20 extends into the housing 12 from the chamber 18 at a location near the top surface 14. A second tunnel 22 extends into the housing 12 from the chamber 18 at a location near the bottom surface 16. Thus, the first and second tunnels 20, 22 function as integral extensions of the chamber 18. As seen in FIG. 2, the first and second tunnels 20, 22 lie on the same plane, however, they extend in opposite directions. A knurl 17 is also disposed around the periphery of the upper portion of the housing in order to facilitate grasping of the clutch fastener 10.

A coil spring 26 is positioned within the chamber 18. The coil spring 26 is formed from a unitary spring stock having a first end 28, and a second end 30. The spring stock is coiled in a helical manner to form the coil spring 26 and define a plurality of coils. The coil spring 26 is formed such that its outermost dimension is slightly smaller than the diameter of the chamber 18. Furthermore, the innermost dimension of the coil spring 26 is approximately equal to the diameter of the shaft 32 so that a frictional fit is created. As used herein, the term outermost dimension represents the distance from the center of the coil spring 26 to the outer surface thereof when viewed from a plane perpendicular to the chamber 18. Similarly, the innermost dimension represents the distance from the center of the coil spring 26 to the inner surface thereof when viewed from a plane perpendicular to the chamber 18.

The first and second ends 28, 30 of the coil spring 26 are disposed within the first and second tunnels 20, 22, respectively. The first and second ends 28, 30 of the coil spring 26 also include a plurality of bends thereon. A plurality of ridges 24 are disposed on the surface of the housing 12 within the first tunnel 22 and the second tunnel 24. The ridges 24 function to engage the bends on the first and second end 28, 30 to secure the coil spring 26 within the chamber 18. Alternatively, the first and second ends 28, 30 can be molded into the housing 12. The housing 12 may also be constructed from two halves, thus allowing the coil spring 26 to be placed in the chamber 18 prior to assembly. The housing 12 and the spring 26 are constructed by utilizing any and all types of materials which currently exist and are known by those skilled in the art to be useful in the manufacture of the aforementioned devices.

In operation, the shaft 32 is inserted into the chamber 18. Since the inner dimension of the coil spring 26 is approximately equal to the diameter of the shaft 32, the coil spring 26 will initially compress. After the compression is terminated, the shaft 32 will be forced into a frictional fit within the coil spring 26.

FIG. 3 illustrates second embodiment of the clutch fastener 50. The clutch fastener 50 includes a housing 52 which has a top surface 54 and a bottom surface 56. A chamber 58 is centrally disposed within the housing 52. The chamber 52 originates near the top surface 54 of the housing 52 and extends through the bottom surface 56. The bottom surface 56 is countersunk to provide for easy insertion of the shaft 32. A first tunnel 60 extends into the housing 52 from the chamber 58 at a location near the top surface 54. A second tunnel 62 extends into the housing 52 from the chamber 58 at a location near the bottom surface 56. A third tunnel 64 and a fourth tunnel 66 are also provided within the housing 52. All four tunnels lie on the same plane. The third tunnel 64 is a mirror image of the first tunnel 60 about the centerline of the chamber 58. Similarly, the fourth tunnel 66 is a mirror image of the second tunnel 62.

A first coil spring 70 having a first and second end 72, 74 is positioned within the chamber 58. A second coil spring 76 having a first and second end 78, 80 is also disposed within the chamber 58 and intertwined with the first coil spring 70. A plurality of coils from the first coil spring 70 is contained by each coil from the second coil spring 76. The second coil spring 76 also includes a plurality of locking coils 82. The housing 58 contains a plurality of slits 63 along the internal surface which defines the chamber 58. The locking coils 71, 82 engage the slits 63 in the housing 52 in order to prevent the spring from being dislodged from the device as well as to restrict the degree of compression of the springs 70 and 76. The first and second ends 72, 74 of the first coil spring 70 are disposed within the first and second tunnels 60, 62, respectively. The first and second ends 78, 80 of the second coil spring 76 are disposed within the third and fourth tunnels 64, 66. The first and second end 72, 74 of the first coil spring 70, and the first and second end 78, 80 of the second coil spring 76 each include a plurality of bends. A plurality of ridges 68 are disposed on the surface of the housing 52 within the first, second, third, and fourth tunnels 60, 62, 64, 66. The ridges 68 function to engage the bends on the first and second end 72, 74 of the first coil spring 70 to secure it within the chamber 58. The ridges 68 function to engage the bends on the first and second end 78, 80 of the second coil spring 76 to secure it within the chamber 58. As previously described, the ends of the first and second spring can be molded into the housing 52. The housing 52 may also be constructed from two halves, thus allowing the coil springs 70, 76 to be placed in the chamber 58 prior to assembly.

FIGS. 4 and 5 illustrates a third embodiment of the invention which allows a user to selectively increase the tension on the shaft in order to provide a more secure fit. The clutch fastener 110 includes a housing 112 which has a top surface 114, a bottom surface 116, and a chamber 118 centrally disposed within the housing 112. The bottom surface 116 is countersunk to provide for easy insertion of the shaft (not shown). A first tunnel 120 extends from the chamber 118 into the housing 112 at a location near the top surface 114, while a second tunnel 122 extends into the housing 112 at a location near the bottom surface 116. A coil spring 126 having a first and second end 128, 130 is placed within the chamber 118. The first and second ends 128, 130 of the coil spring 126 are positioned within the first and second tunnels 120, 122, respectively. The first end 128 of the coil spring 126 terminates in a hook 129 while the second end 130 includes a plurality of bends. The second tunnel 122 includes a plurality of ridges 124 disposed on the surface thereof for engaging the bends on the second end 130 of the coil spring 126 to secure it within the chamber 118.

An arm 132 having a first end and a second end extends into the housing 112 from the top surface 114 and terminates at a location near the bottom surface 116. The arm 132 is oriented such that it is parallel to the chamber 118 and perpendicular to the first tunnel 120. The arm 132 is further positioned such that it intersects the first tunnel 120. A handle 134 is attached to the first, or external, end of the arm 132 in order to selectively place the arm 132 in a locked or unlocked position. A cam lobe 136 is operatively coupled to the arm 132 such that it is disposed within the first tunnel 120. The first end 128 of the coil spring 126 extends such that the hook 129 is placed in contact with the cam lobe 136. When the arm 132 is placed in the locked position, the cam lobe 136 engages the hook 129 and stretches the coil spring 126. This action increases the tension on the coils of the coil spring 126 in order to effectively increase the amount of force applied to retain the shaft within the clutch fastener 110.

Figure 6:
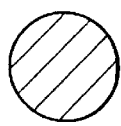
FIG. 6 is an end cross-sectional view of a first spring stock for use with the clutch fastener.
Figure 10:
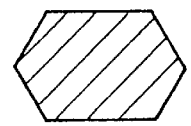
FIG. 10 is an end cross-sectional view of a fifth spring stock for use with the clutch fastener.
Figure 7:
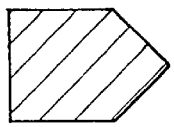
FIG. 7 is an end cross-sectional view of a second spring stock for use with the clutch fastener.
Figure 11:
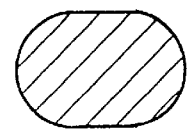
FIG. 11 is an end cross-sectional view of a sixth spring stock for use with the clutch fastener.
Figure 8:
FIG. 8 is an end cross-sectional view of a third spring stock for use with the clutch fastener.
Figure 12:
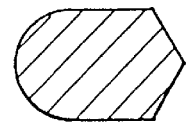
FIG. 12 is an end cross-sectional view of a seventh spring stock for use with the clutch fastener.
Figure 9:
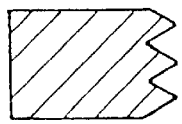
FIG. 9 is an end cross-sectional view of a fourth spring stock for use with the clutch fastener.
Figure 13:
FIG. 13 is a side cross-sectional view of an alternative spring stock.
Figure 14:
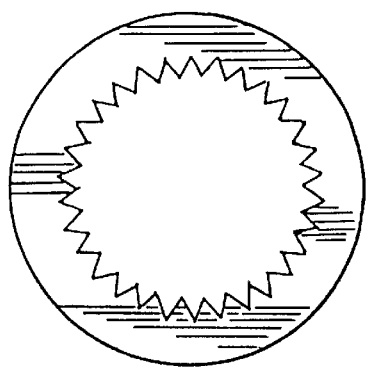
FIG. 14 is a top plan view of a spring formed from the stock shown in FIG. 13.

Various spring stock designs may be used to fabricate the coil spring used in the clutch fastener, as seen in FIGS. 6–13. FIG. 6 is an end cross-section of a common spring stock used to fabricate coil springs. When the coil spring is formed, a point contact is created with the chamber as well as the shaft. FIG. 7 illustrates an end cross-section wherein one edge of the spring stock is in the form of a single upswept tooth. The opposite side of the spring stock is completely flat in order to generate maximum frictional contact with the shaft. Furthermore, the top and bottom surfaces are flattened in order to provide better stability when the coil spring is compressed. FIGS. 8 and 9 illustrate various designs of spring stock containing multiple upswept teeth. FIG. 10 illustrates a spring stock which contains a single upswept tooth for contacting both the chamber and the shaft. FIG. 11 illustrates a spring stock which contains curved sides and flat top and bottom surfaces, while FIG. 12 shows a variation with one side curved and a single upswept tooth on the other side. FIG. 13 illustrates the cross-section of a spring stock taken along its length, while FIG. 14 is a top plan view of the resulting coil spring. The coil spring is designed to allow a user to thread the clutch fastener clockwise onto a shaft, while resisting counter-clockwise rotation thereof. Accordingly, the spring stock contains a plurality of directional teeth, as seen in FIG. 13.

It is to be understood that the present invention is not limited to the embodiments described above, but encompasses any and all embodiments within the scope of the following claims.

I claim:

1. A clutch fastener for securely retaining a pin or shaft comprising:

a housing including a top surface and a bottom surface, said housing further containing a chamber centrally disposed therein, said chamber extending from a location proximate said top surface and extending through said bottom surface, said bottom surface being countersunk and adapted for easy insertion of the pin or shaft to be received, and said chamber being sized larger than the diameter of the pin or shaft to be received;

a coil spring formed from a unitary piece of spring stock having a first and second end, and coiled in a helical manner to define a plurality of coils, said coil spring being disposed within said chamber, said coil spring including an outer edge diameter slightly smaller than the diameter of said chamber, and said coil including an inner edge diameter dimensioned to fictionally retain the pin or shaft; and means for retaining said coil spring within said housing: wherein said housing contains a first and second tunnel, each of said tunnels being oriented perpendicular to said chamber, said first tunnel being disposed proximate said top surface and said second tunnel being disposed proximate said bottom surface, both of said tunnels including ridged interiors, and said means or retaining comprises a plurality of bends disposed on the first and second ends of said coil spring, said bends being angled and sized for allowing snug retainment of said first and second ends within said first and second tunnels, respectively.

2. A clutch fastener as recited in claim 1 further comprising a knurl peripherally disposed around said top surface for providing a convenient gripping area.

3. A clutch fastener as recited in claim 2 wherein the cross-sectional profile of said coils includes beveled outer edges and flat inner edges to provide an increased frictional surface for retaining the pin or shaft.

4. A clutch fastener as recited in claim 2 wherein the cross-sectional profile of said coils include beveled outer edges and a plurality of upswept teeth disposed on the inner edge for retaining said pin or shaft.

5. A clutch fastener as recited in claim 2 wherein the cross-sectional profile of said coils includes a plurality of teeth disposed on the inner edge for engaging said pin or shaft in a positive twisting manner.

6. A clutch fastener as recited in claim 2 wherein the cross-sectional profile of said coils include beveled edges.

7. A clutch fastener as recited in claim 2 wherein said coils further include flat top and bottom surfaces for increasing a contact patch between adjacent coils.

8. A clutch fastener for securely retaining a pin or shaft comprising:

a housing including a top surface and a bottom surface, said housing further containing a chamber centrally disposed therein, said chamber extending from a location proximate said top surface and extending through said bottom surface, said bottom surface being countersunk and adapted for easy insertion of the pin or shaft to be received, and said chamber being sized larger than the diameter of the pin or shaft to be received;

a coil spring formed from a unitary piece of spring stock having a first and second end, and coiled in a helical manner to define a plurality of coils, said coil spring being disposed within said chamber, said coil spring including an outer edge diameter slightly smaller than the diameter of said chamber, and said coil including an inner edge diameter dimensioned to fictionally retain the pin or shaft;

means for retaining said coil spring within said housing; and locking means for selectively placing increased tension on the pin or shaft;

wherein the first end of said coil spring terminates in a hook, said housing contains a first tunnel positioned proximate said top surface and aligned perpendicularly to said chamber for receiving the first end of said coil spring, and said locking means comprises:

an arm having a first end located external of said clutch fastener and a second end located proximate said bottom surface, said arm being oriented parallel to said chamber;

a handle attached to the first end of said arm, said handle being capable of selectively placing said arm in a locked and an unlocked position;

a cam lobe positioned in registry with said first tunnel and operatively coupled to said arm for engaging said hook and exerting pressure onto the first end of said coil spring responsive to the position of said handle, thereby increasing the tension on said pin or shaft.

9. A clutch fastener for securely retaining a pin or shaft comprising:

a housing including a top surface and a bottom surface, said housing further containing a chamber centrally disposed therein, said chamber extending from a location proximate said top surface and extending through said bottom surface, said bottom surface being countersunk and adapted for easy insertion of the pin or shaft to be received, and said chamber being sized larger than the diameter of the pin or shaft to be received;

coil spring formed from a unitary piece of spring stock having a first and second end, and coiled in a helical manner to define a plurality of coils, said coil spring being disposed within said chamber, said coil spring including an outer edge diameter slightly smaller than the diameter of said chamber, and said coil including an inner edge diameter dimensioned to fictionally retain the pin or shaft:

means for retaining said coil spring within said housing; and means for limiting the degree of compression of said coil spring: wherein said housing contains a plurality of slits disposed within the surrounding surface of said chamber, and said means for limiting the degree of compression comprises a second coil spring intertwined with said first coil spring, the coils of said second coil spring being capable of fitting into said slits, the coils of said second coil spring being formed with a predetermined period for defining the degree of compression of a select number of coils from said first coil spring, and further comprising means for retaining said second coil spring within said housing.

* * * * *